Feb. 28, 1961 Q. P. PENISTON 2,973,250
APPARATUS FOR COUNTER CURRENT DISTRIBUTION
Filed Jan. 28, 1957 2 Sheets-Sheet 1
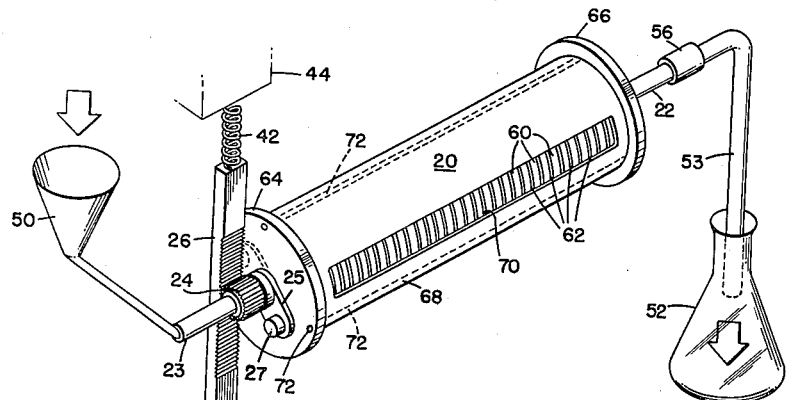
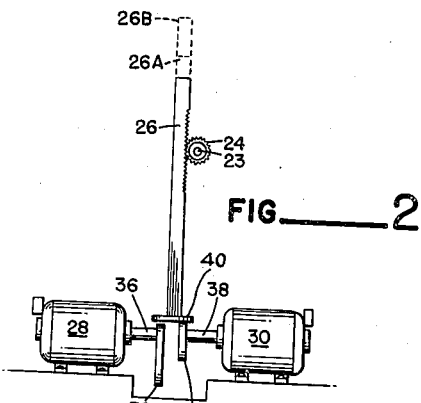
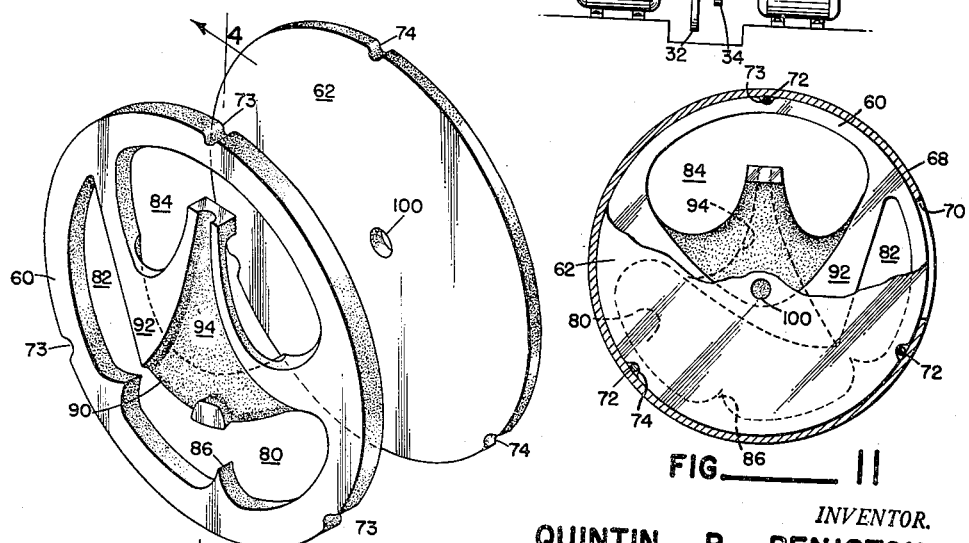
INVENTOR.
QUINTIN P. PENISTON
BY
Smith & Tuck Feb. 28, 1961

Q. P. PENISTON 2,973,250

APPARATUS FOR COUNTER CURRENT DISTRIBUTION

Filed Jan. 28, 1957

QUINTIN P. PENISTON
*INVENTOR.*

BY *Smitt + Tuck*

United States Patent Office 2,973,250
Patented Feb. 28, 1961

2,973,250
APPARATUS FOR COUNTER CURRENT DISTRIBUTION

Quintin P. Peniston, Bainbridge Island, Wash., assignor to Food, Chemical & Research Laboratories Inc., Seattle, Wash., a corporation of Washington Filed Jan. 28, 1957, Ser. No. 636,587

6 Claims. (Cl. 23—270.5)

My invention relates to means for counter current discontinuous fractionation of a solute mixture dissolved in heavier and lighter immiscible solvents. More particularly, the invention pertains to a cyclical apparatus including a series of separator bodies mounted in a bank and so interrelated as to perform a number of full decantation and equilibration processes in each cycle of operation. The decantation step together with an equilibration stage results in discontinuous flow of the solute mixture through the system.

This invention is an approach to the separation of mixtures of organic substances by physical means other than fractional distillation. In this case such separation is effected by counter current distribution of the components of a solute mixture between a pair of immiscible liquids.

In general, when such a mixture is brought to solution equilibrium between a pair of immiscible liquid solvents, each component in the mixture will be distributed between the solvents according to the partition coefficients characteristic of the components and the solvents concerned. If the partition coefficients for the different components are different, then separation of the components is possible by a multi-stage distribution process. This may be carried out as follows:

Let a long row of separatory funnels be set up each containing an equal volume of ether, for example. Let a quantity of the mixture to be separated be dissolved in a volume of a liquid immiscible with ether, i.e. water. Let the water solution be added to the first separatory funnel and the whole be brought to equilibrium by agitation. Then let the ether and water solutions be allowed to separate and let the water solution be drawn off into the second separatory funnel. Now let the solutions in funnels 1 and 2 be agitated, separated, and the water from 2 be drawn off into 3, that from 1 be drawn off into 2 and fresh water be again added to 1. The process is repeated, the water solution advancing after equilibration and separation funnel by funnel, 3 into 4, 2 into 3, 1 into 2, and so forth. Eventually the last funnel in the line will be brought into play and thereafter a quantity of water solution will be obtained from the last funnel after each equilibration. It can readily be seen that the components of the mixture whose partition coefficients favor solution in water will move down the line of funnels faster than those whose partition coefficients favor solution in ether. Separation will be effected to an extent dependent on the difference in partition coefficients, the relative volumes of ether and water and the number of funnels. The number of equilibrations, separations and decantations necessary to bring the first sample of water solution to the end of the line with 100 funnels, for example, would be:

$$1+2+3+4+5 \ldots 95+96+97+98+99+100=5050$$

and 100 for each sample thereafter. It is desirable to conduct the tedious operation automatically and certain commercial applications are only economically feasible in an automatic operation.

My invention concerns a discontinuous distribution system, and this should be clearly distinguished from a continuous distribution as the latter is different in principle and in separation efficiency. In a continuous system there may be a tendency to separate lighter and heavier components, but the continuous system has several disadvantages, some of which are fatal to conducting many operations. For an efficient separation by the method of using the different partition coefficients of materials, at each stage the liquid then present should be brought into equilibrium. Without such equilibration step, the device would not only be inefficient but also could not achieve the desired separation in many operations. Furthermore, with the discontinuous process, there can be close computations as to the results expected and achieved, whereas the continuous process would be subject to too many variables for exact prediction or conclusion. With my apparatus we can approach the efficiency of decantation and equilibration of the separatory funnels above described, whereas in the continuous process, thorough decantation and equilibration would not be possible.

The objects of my invention include therefore; to improve the apparatus for counter current distribution and to improve the method of counter current distribution; to devise a discontinuous fractionation distributor and an improved method of operation; to design such a separator with means for achieving an equilibration step and a decantation step at each stage of separation; to avoid the disadvantages of a continuous fractional distributor in my apparatus; and to improve the efficiency and economy of operation and construction of this type of equipment.

The use of the above described separatory funnels is prohibitively time-consuming and expensive, and it is a further object of my invention to simulate the use of separatory funnels in this process by thoroughly automatic means, subject to automatic control and achieving a large number of decantations in each cycle of operation.

Apart from the general theory of operation, many problems arise in the construction of a suitable commercial apparatus to achieve the objectives. Therefore, further objectives of my invention include: to provide a multiplicity of separator bodies mounted interconnected and juxtaposed in a bank and adapted to perform an equilibration step and a decantation step when pivoted in a certain cycle; and to devise such separator bodies of efficient and economical construction so that this apparatus will be suitable for mass production.

The function of the assembly of cells in the distributor is exactly analogous to the sequence of the operations performed with the row of separatory funnels as described in column 1, line 40 thru column 2, line 2. There are certain functional features inherent in this sequence which are also inherent in the operation of the apparatus described. These are:

(1) The operation is a batch operation being performed on an isolated quantity of a mixture of substances dissolved in a solvent and initially placed in the first funnel of the row or the first cell of the distributor.

(2) The operation is discontinuous being performed in a series of discrete steps as follows:

(a) Equilibration of the components of the mixture between two immiscible solvent phases—by shaking the separatory funnels or by rocking the assembly of cells in the distributor.

(b) Allowing the immiscible solvent phases to separate by quiescent force of gravity—not centrifugal force.

(c) Decanting the lighter solvent phase from the heaviest solvent phase.

(d) Advancing one of the solvent phases to the next separatory funnel or the next cell of the distributor. In the row of separatory funnels the heavier phase is advanced, the lighter phase remaining in the funnel, in the distributor the lighter phase advances and the heavier phase remains in the cell. In either case there is a displacement from cell to cell of one of the solvent phases relative to the other.

(e) Addition of a new increment of the "mobile" solvent heavier or lighter as the case may be to the initial end funnel or end cell of the distributor and (f) Collection of an increment of the mobile solvent phase from the final funnel or cell as an isolated fraction containing a part of one or more of the components of the original mixture depending on relative partition coefficients of the components between the solvents used and the number of cells.

This sequence of operations is repeated as often as necessary until all components of the original mixture have been carried through the apparatus in turn.

(3) While the sequence of operations is commonly referred to as "countercurrent distribution" there is no true countercurrent flow in that one of the solvent phases is trapped in descrete portions in the funnels or cells and does not flow at all. This anomaly is well understood by those skilled in the art of separations of this type.

My invention will be best understood, together with additional objectives and advantages thereof, from a reading of the following description, together with reference to the drawings, in which:

Figure 1 is a perspective view, in schematic form, showing a specific embodiment of my distribution apparatus;

Figure 2 is an end elevational view on reduced scale of part of the operating mechanism shown in Figure 1;

Figure 3 is an enlarged exploded view showing a separator body of the type which is arranged juxtaposed in a bank in the apparatus of Figure 1;

Figure 8:
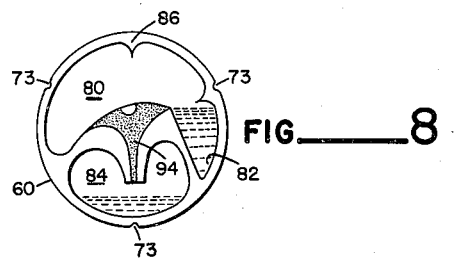
Figure 5:
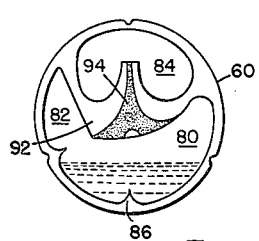
Figure 6:
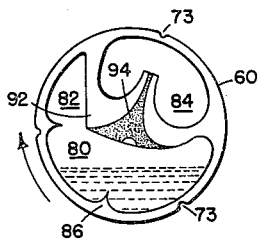
Figure 7:
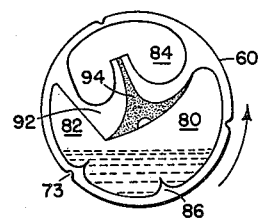
Figure 9:
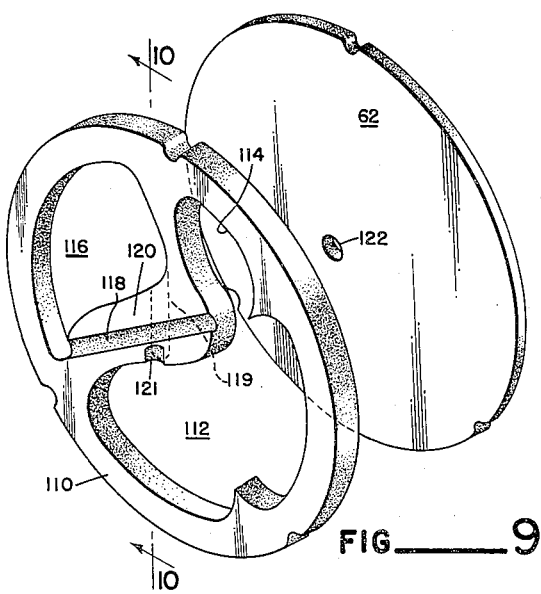
Figure 10:
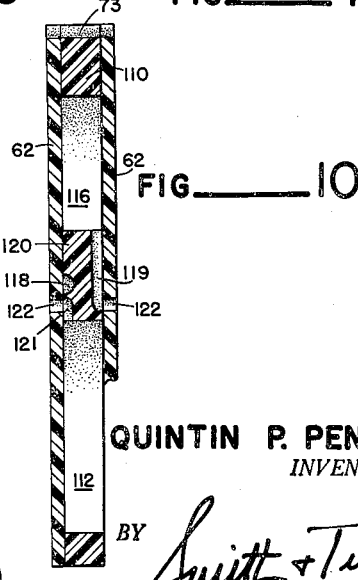

Figures 5, 6, and 7 schematically show the operation of the separator body shown in Figure 3 during the equilibration stage;

Figure 8 is a view similar to Figure 5-7 only in the next step of decanting a lighter liquid part from a heavier part;

Figure 9 is an enlarged perspective view of a modified form of a separator body;

Figure 10 is a sectional view taken on lines 10—10 of Figure 9; and

Figure 11 is a reverse plan view of the separator body of Figure 3.

Discontinuous fractionation of solute mixtures dissolved in heavier and lighter immiscible solvents is accomplished by apparatus, as shown, including a cylindrical, sectional, distributor 20. The distributor comprises the casing 68 having end plates or trunnion heads 64, 66 secured thereto each supporting a hollow trunnion axle 22, 23 respectively. Bearing means, not shown, receive the axles 22, 23 and support the distributor for rotary or oscillatory motion. Pinion 24 on axle 23 meshes with the teeth of rack 26. The relatively broad foot 40 of rack 26 rests on one or both of the eccentric cams 32, 34 that are respectively rotated by shafts 36, 38 of motors 28 and 30. Rack 26 is suitably guided for vertical reciprocal movement and is pressed from above by compression spring 42 that abuts support means 44. Spring 42 presses the rack to cams 32, 34 and insures that foot 40 physically follows the contours of the eccentric cams.

Rotation of cam 34 produces reciprocation of rack 26 and a relatively small amount of oscillatory movement of distributor 20, i.e., plus or minus 10-20 degrees from a mean position. Cam 32 periodically acts on the rack 26 to more fully oscillate or rotate distributor 20 as will be fully described hereafter. In Figure 2 dotted line positions of racks 26 and designated 26a and 26b and show the limits of vertical movement of rack 26 responsive to cams 34 and 32 as the case may be. The size of the cams and the proportion of parts are such as to obtain the movement schematically illustrated in Figures 5 through 8. The provision of electrical control means for motors 28 and 30 and the associated proportioning of parts is such as to obtain the desired sequence of operation and is well understood in the electrical control art and have therefore not been here shown. The presentation of the distributor rotating means and supply and discharge means are all shown schematically as those skilled in the art will readily understand their construction and may well deviate from the present showing in a particular commercial or laboratory installation, having in mind the particular disclosure of the construction of my distributor 20 and the desired sequences of operation as set forth in this specification.

A supply of material to be treated is introduced to the distributor through the funnel 50 feeding to the hollow axle 23 and thence to the interior of the distributor 20. At the opposite end of the distributor axle 22 discharges treated fluid material from the distributor to receptacle 52 by means of conduit 53 the supply and discharge means have swivel type connections or couplings as connector 56 between shaft 22 and tube 53. Casing 68 of the distributor 20 is a hollow cylindrical member having an elongated window 70 along one side. The casing 68 and heads 64, 66 may be secured together in the assembled relationship shown in Figure 1 by bolts 72 extending between heads 64, 66.

Distributor 20 includes within casing 68 a series of individual broad-faced thin separator cells that are secured together in face-to-face juxtaposition. Each separator cell in the preferred form comprises a separator body 60 having on opposite faces a separate disc shaped partition plate 62. In a series, a plurality of separator bodies 60 is grouped with a single plate 62 between each pair in alternating arrangement. The separator body 60 and plate 62 are notched at their peripheries and the tie-rods 72 inside casing 68 pass through the notches 73 and 74 of body 60 and plate 62 respectively to serve to hold these elements correctly related to each other. Observation of conditions within the distributor 20 is facilitated by the window 70 since the separator body 60 and plate 62 are preferably formed of glass or clear plastic material of a transparent nature. Such examination of interior conditions from the outside obviates the necessity of disassembling the apparatus and permits the observation of conditions such as foaming, flooding or other actions which may be desirable or undesirable that could occur in the operation of the distributor yet otherwise be unknown to the operator. In that instance where the separator body 60 may be formed of opaque material then window means such as glass inserts or the like may be incorporated in the body rim at a position that would match with the window 70.

Each separator body 60 is divided into an equilibration chamber 80, decantation residuum chamber 82 and a decantate chamber 84. Preferably each equilibration chamber has a capacity related to the combined capacities of chambers 82 and 84 such that it may receive, in the last stage of each cycle, the liquid contained in the corresponding residuum and decantate chambers of an adjacent separator body. During the equilibration step, separator bodies 60 are together operated in a stage which may include rotation 10-20 degrees in each direction from a mean position. This is illustrated in Figures 5, 6 and 7. The equilibration is continued for a length of time dependent on the liquids and the materials involved. A weir 86 in the base of the equilibration chamber 80 serves to agitate liquid materials in the chamber during the equilibration stage.

The residuum receiving chamber is preferably open to the equilibration chamber 80. Following equilibration the next step is decantation in which the bodies 60 of distributor 20 are together revolved counter-clockwise as viewed in Figures 5–8. Between the position of Figure 7 and the position of Figure 8 the immiscible liquids tend to separate into a heavier part that flows into residuum chamber 82 the remaining lighter part that overlies the heavier part decants over lip 90 of the partition 92 between the residuum and decantation chambers 82, 84 and flows through the necked gullet 94 which discharges into the decantate chamber 84.

It is preferred in this decantation stage that separator bodies 60 be first pivoted from the position of Figure 7 to a position just short of that shown in Figure 8 in which residuum chamber 82 fills with a heavier portion of the material under treatment. Body 60 may be stopped in this position before continuing the rotation to a point where the lighter liquid pours over lip 90 as shown in the Figure 8 position. This stop provides time for lighter materials to rise from the heavier material and insures that the decantate chamber will receive a more efficiently separated charge than might be obtained without such a pause. The length of such stop is governed by the nature of the materials and any emulsification tendencies.

The next step in this cycle after equilibration is to rotate body 60 clockwise from the position of Figure 8 to the position of Figure 5 thereupon the heavier liquid in residuum chamber 82 flows back into the equilibration chamber 80. The lighter part of the liquid in decantation chamber 84 may then pass through an opening 100 in the contiguously adjacent plate 62 thence to the gullet 94 of the next adjacent separator body 60 where it intermingles with the residuum that has been retained in the equilibration chamber 80 of such next adjacent separator body 60.

At each cycle of the operation, preferably an increment of the lighter liquid is introduced automatically through the supply means 50 into the equilibration chamber next adjacent to end plate 64. When the distributor is fully operated a comparable amount of lighter solvent is discharged from the decantate chamber 84 at the other end of the series of separator cells next to end plate 66. This fluid discharge passes through discharge tube 53 to receptacle 52. By means of a series of separate receptacles 52 which are disposed in timed sequence to receive fluid charges, each will receive the fluid of different cycles of operation of the distributor.

Referring back to the separatory funnels described above it will be seen that a like operation is achieved at each cycle of distributor 20 such operations being multiplied by the number of separator bodies 60 included in the distributor.

At the start of a separation operation the heavier of two immiscible solvent liquids is introduced through the supply means 50 in sufficient quantity to fill all of the residuum chambers 82 and the mixture to be separated, dissolved in either solvent, is introduced to the first separator body adjacent end plate 64. During equilibration in chamber 80, the separator bodies are suitably oscillated through an angle of plus or minus 10 or 20 degrees from a mean position. The weir 86 facilitates equilibration by increasing convection of the liquid. The rate of oscillation desired and the number of oscillations necessary to attain equilibrium will vary with different liquids used and the dissolved substances. In general, the rate will be 20–60 o.p.m. for a total of between 20 and 100 oscillations. When equilibration is complete, the motor operating cam 34 is turned off and the bodies are rotated clockwise through an angle of approximately 180 degrees from the zero position by motor 28 and cam 32 causing decantation. The gullet 94 and opening 100 is located to provide a free flow of liquid in transfer from one separator body to another thus avoiding back flow. The chamber volumes at all positions of the cycle are adequate to avoid overflowing or flooding. The contour of the partition wall 92 adjacent lip 90 is such as to avoid air entrapment which would interfere with the decantation.

Figure 4:
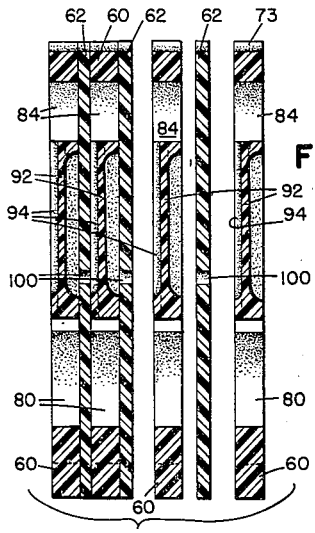
Figure 4 is a sectional view taken along line 4—4 of Figure 3.

Other equipment can be devised, after knowledge of the present disclosure, to modify distributor 20 and the cycle of operation to achieve like results to the construction as shown in Figures 3 and 4 but this structure is preferred as it is highly efficient and economical. That which reasonably occurs to those skilled in the art and which falls within the spirit and scope of the subjoined claims is intended to be patented herein.

One modification is shown in Figure 9 in which separator body 110 has equilibration compartment 112, residuum chamber 114 and a closed decantate compartment 116. Flow of the decantate toward chamber 116 is through a grooved passageway 118 closed on one side by a corresponding divider wall 120. A second grooved passageway 119 extends from decantate chamber 116 to an opening 122 in the divider plate 62 at the other side for flow of the decantate from decantate compartment 116 to the next adjacent equilibration chamber. Notch or void 121 in wall 120 permits inflowing material from the next preceding cell to enter the equilibration chamber 112.

After the desired separation has been achieved, it is desirable to then dump the remaining heavier liquid parts in distributor 20 by a power cycle rather than dismantling the equipment or by hand operation. The construction shown in Figure 3 is particularly desirable in this dumping operation. All that is required for dumping is for the movement from the position of Figure 7 to that of Figure 8 be conducted in an opposite direction from that in the separation cycle, e.g., clockwise instead of counter-clockwise. In each cycle the contents of equilibration chamber 80 will then be poured directly through mouth 94 into decantate chamber 84. An important feature is that the heavier part will then travel in the same direction through distributor 20 that the lighter part travels during the separation operation, i.e. from end 64 to end 66. This means that the same discharge apparatus can be used instead of having to change the supply system to receive discharge, which would be the case if separated and dumped liquids did not travel in the same direction through the apparatus. This unidirectional flow in both the regular separation operation and in the dumping operation is not found in the construction of Figures 9 and 10. In dumping the heavier remaining liquids in the Figure 9 construction, the distributor is moved counter-clockwise, but the heavier liquids to be dumped move toward the supply end of the distributor, and the supply system must be disconnected so that the discharge will be received.

In the dumping cycles of both forms of the invention, the oscillating movement in the equilibration position can be omitted and no pause need occur in moving counter-clockwise to the Figure 8 position. The reversal of the cycle is simply accomplished in Figure 1 by having the stub axle 23 attached to end plate 64 by an arm 25 adjustably secured to the end plate by screw 27. Changing the point on end plate 64, to which screw 27 secures, 180 degrees results in a reversal of the effective cycle.

Having thus described my invention, I do not wish to be limited to the precise details of construction disclosed but instead wish to cover those modifications thereof which will occur to those skilled in the art after reading my disclosure and which fairly fall within the scope of my invention, as described in the appended claims.

I claim:

1. Apparatus for counter current discontinuous fractionation of a solute mixture dissolved in heavier and lighter immiscible solvents, comprising: a series of broad-faced, thin, cylindriform cells secured together in face-to-face juxtaposition; means for supporting the cells for conjoint cyclic oscillatory movement about a common horizontal axis; each cell including wall means forming a residuum chamber, a decantate chamber, and an equilibration compartment larger than and coplanar with said residuum chamber and decantate chamber; said cells being arranged in said series so that the chambers and compartments of the cells are uniformly arranged relative said horizontal axis; each said decantate chamber being opposite and normally above the equilibration compartment; each said residuum chamber being located adjacent one end of the related equilibration compartment and in communication therewith; means forming a decantate passage in each cell between each said equilibration compartment and each said decantate chamber; means forming a drain opening from each decantate chamber and an inlet to the equilibration compartment of the next adjacent cell; each said decantate chamber being so proportioned and the discharge end of each decantate passage being so disposed and separated from each drain opening that, when the decantate chamber contains decantate, the decantate passage discharge end is above the decantate surface and said decantate surface is below the drain opening; said drain openings being located to unidirectionally drain said decantate chambers throughout the series of cells; whereby, with said equilibration compartment disposed lowermost, oscillation of the series of cells agitates the lighter and heavier solvent mixtures in intimate contact in the equilibration compartment; and discontinuation of said oscillation permits separation of the solvent phases; and subsequent relatively slow rotation of the series of cells, through an angle of about 180 degrees in such direction that each residuum chamber follows the related equilibration compartment, transfers each heavier solvent phase into a residuum chamber and decants each lighter solvent phase into a decantation chamber; and reverse rotation of the series of cells, through an angle of about 180 degrees, returns the heavier solvent phase in each residuum chamber to the equilibration compartment from which the same was transferred, and drains the light solvent phase in each decantation chamber through the related drain opening into the equilibration compartment of the next adjacent cell.

2. The subject matter of claim 1 in which the series of cells is formed of a plurality of coaxially aligned discs, each disc being perforated to define said chambers and said compartment; and a plate wall, interposed between each adjacent pair of discs, is perforated to form the drain passage from the decantate chamber of one adjacent disc to the equilibration chamber of the other adjacent disc.

3. The subject matter of claim 1 in which there is a weir in bottom of the equilibration compartment.

4. The subject matter of claim 1 in which each decantate passage includes a sharp lip closely adjacent the opening to the residuum chamber.

5. The structure according to claim 1 in which is included cyclically staged rotary means having a predetermined cycle of operation to actuate said series of cells as described.

6. A cell for fractionation of a solute mixture dissolved in heavier and lighter immiscible solvents, comprising: a cylindriform body mounted for rotation about its normal axis; said body internally including as integral parts of the body structure wall means forming a residuum chamber, a decantate chamber, and an equilibration compartment larger than and coplanar with said residuum and decantate chambers; said decantate chamber being opposite and normally above the equilibration compartment; said residuum chamber being located adjacent one end of the equilibration compartment and in communication therewith; means forming a decantate passage between said equilibration compartment and said decantate chamber; means forming a feed inlet to said equilibration compartment; means forming a drain opening from the decantate chamber to outside the cell; said decantate chamber being so proportioned and the discharge end of said decantate passage being so disposed and separated from the drain opening that, when the decantate chamber contains decantate, the decantate passage discharge end is above the decantate surface and the decantate surface is below the drain opening; and means operable to rotate said cell through an angle of about 180° in one direction and operable to reversely rotate said cell back through said angle.

References Cited in the file of this patent
UNITED STATES PATENTS

| 2,036,924 | Coutor | Apr. 7, 1936 |
| 2,765,298 | Signer | Oct. 2, 1956 |

FOREIGN PATENTS

| 937,733 | Germany | Jan. 12, 1956 |

OTHER REFERENCES

Wilhelm and Foos: A Counter-Current Liquid-Liquid Extractor, U.S. Atomic Energy Commission, Sept. 8, 1955, Iowa State College Report 458.